United States Patent
Yan et al.

(10) Patent No.: US 9,904,502 B2
(45) Date of Patent: Feb. 27, 2018

(54) DUAL DISPLAY EQUIPMENT WITH ENHANCED VISIBILITY AND SUPPRESSED REFLECTIONS

(71) Applicant: Apple Inc., Cupertino, CA (US)

(72) Inventors: Jin Yan, Santa Clara, CA (US); Enkhamgalan Dorjgotov, San Francisco, CA (US); Young Cheol Yang, Sunnyvale, CA (US); Li Zhang, Sunnyvale, CA (US); Xiaokai Li, Cupertino, CA (US); Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 14/862,012

(22) Filed: Sep. 22, 2015

(65) Prior Publication Data

US 2017/0039018 A1     Feb. 9, 2017

Related U.S. Application Data

(60) Provisional application No. 62/201,359, filed on Aug. 5, 2015.

(51) Int. Cl.
*G06F 3/14*      (2006.01)
*G06F 1/16*      (2006.01)
*H04M 1/02*      (2006.01)

(52) U.S. Cl.
CPC .......... *G06F 3/1423* (2013.01); *G06F 1/1601* (2013.01); *G06F 1/1616* (2013.01);
(Continued)

(58) Field of Classification Search
CPC .... G06F 1/1616; G06F 1/1647; G06F 1/1649; G06F 1/1601; G06F 1/162; G06F 3/1423;
(Continued)

(56) References Cited

U.S. PATENT DOCUMENTS

| 6,744,478 B1* | 6/2004 | Asakura ............. G02B 27/0101 349/11 |
| 7,158,095 B2 | 1/2007 | Jenson et al. |

(Continued)

OTHER PUBLICATIONS

Gibbs, Keith. (2013). "Reflection (Plane Mirrors)". Schoolphysics. Retrieved from http://www.schoolphysics.co.uk/age16-19/Optics/Reflection/text/Reflection_/index.html, downloaded Jan. 26, 2017, p. 3, Fig. 3.*

(Continued)

*Primary Examiner* — Darlene M Ritchie
(74) *Attorney, Agent, or Firm* — Treyz Law Group, P.C.; G. Victor Treyz; Joseph F. Guihan

(57) ABSTRACT

Electronic equipment with displays may be provided. A first display may be mounted in a first housing and a second display may be mounted in a second housing that is adjacent to the first housing. The first housing may rotate relative to the second housing about a hinge axis. The first housing may be a lid and the second housing may be a base housing that is coupled to the lid by a hinge. A first display may be mounted in the first housing and a second display may be mounted in the second housing. Polarizer layers and other optical layers in the displays may be configured to provide a viewer with the ability to view images on the displays while wearing vertically polarized sunglasses and to suppress reflections of light emitted by the first display off of the second display.

23 Claims, 8 Drawing Sheets

(52) U.S. Cl.
CPC ..... *G06F 1/1649* (2013.01); *G09G 2320/028* (2013.01); *G09G 2320/0261* (2013.01); *G09G 2360/144* (2013.01); *H04M 1/0216* (2013.01)

(58) Field of Classification Search
CPC ........... H04M 2250/16; H04M 1/0216; H04M 1/0235; G09G 2300/023
See application file for complete search history.

(56) References Cited

U.S. PATENT DOCUMENTS

| | | | |
|---|---|---|---|
| 8,154,800 B2 | 4/2012 | Kean et al. | |
| 8,558,970 B2 | 10/2013 | Obata et al. | |
| 8,992,050 B1 | 3/2015 | Yuan et al. | |
| 2003/0210360 A1* | 11/2003 | Yoshida | G02F 1/13362 349/96 |
| 2005/0151830 A1* | 7/2005 | Yamazaki | H01L 27/322 347/238 |
| 2005/0156813 A1* | 7/2005 | Adachi | G02B 27/2278 345/1.3 |
| 2005/0157224 A1* | 7/2005 | Kanbe | G02F 1/133536 349/96 |
| 2006/0044286 A1* | 3/2006 | Kohlhaas | G02F 1/13338 345/173 |
| 2007/0159602 A1* | 7/2007 | Fergason | G02B 27/26 353/8 |
| 2010/0277443 A1* | 11/2010 | Yamazaki | G06F 1/1616 345/204 |
| 2012/0062527 A1* | 3/2012 | Cheong | G02F 1/1347 345/204 |
| 2012/0257127 A1 | 10/2012 | Miyazawa et al. | |
| 2014/0101575 A1* | 4/2014 | Kwak | G06F 1/1616 715/761 |
| 2014/0152703 A1* | 6/2014 | Yang | G09G 5/10 345/690 |
| 2014/0240342 A1* | 8/2014 | Xu | G09G 3/36 345/590 |
| 2015/0042704 A1* | 2/2015 | Smith | H04N 13/0402 345/697 |
| 2015/0255023 A1* | 9/2015 | Lee | G09G 3/36 345/204 |
| 2016/0104410 A1* | 4/2016 | Sagardoyburu | G09G 3/2003 345/4 |
| 2016/0216540 A1* | 7/2016 | Cho | G02F 1/133536 |
| 2017/0031206 A1* | 2/2017 | Smith | G02F 1/133514 |

OTHER PUBLICATIONS

"Electricity and Magnetism Lecture 24". (Spring 2013). University of Illinois at Urbana-Champaign. https://courses.physics.illinois.edu/phys212/sp2013/lectures/lecture24.pdf. Retrieved Jul. 30, 2017.*

* cited by examiner

DUAL DISPLAY EQUIPMENT WITH ENHANCED VISIBILITY AND SUPPRESSED REFLECTIONS

This application claims the benefit of provisional patent application No. 62/201,359 filed on Aug. 5, 2015, which is hereby incorporated by reference herein in its entirety.

BACKGROUND

This relates generally to electronic devices and, more particularly, to electronic devices with displays.

Laptop computers and other electronic devices include displays. Displays often include polarizers. For example, liquid crystal displays have a layer of liquid crystal material and substrate layers that are sandwiched between a pair of linear polarizers. Organic light-emitting diode displays often include circular polarizers to suppress ambient light reflections.

It can be challenging to configure the polarizers in an electronic device for optimum performance over all possible operating conditions. For example, some polarizer arrangements may help provide a display with a wide range of off-axis viewing angles, whereas other polarizer arrangements may enhance sunglass compatibility. Further complications may arise in systems with multiple display surfaces due to the potential for unwanted reflections.

It would therefore be desirable to be able to provide improved optical configurations for electronic devices with displays.

SUMMARY

Electronic equipment with dual displays may be provided. A first display may be mounted in a first housing and a second display may be mounted in a second housing that is adjacent to the first housing. The first housing may rotate relative to the second housing about a hinge axis. The first housing may be a lid and the second housing may be a base housing that is coupled to the lid by a hinge or the first and second housings may be associated respectively with a device and an accessory that is coupled to the device. A first display may be mounted in the first housing and a second display may be mounted in the second housing. When the first display emits light, there is a possibility that some of the light will reflect off of the second display towards a viewer.

Polarizer layers and other optical layers such as wave plates in the displays may be configured to provide a viewer with the ability to view images on the displays while wearing vertically polarized sunglasses and to suppress reflections of light emitted by the first display off of the second display.

The first display may be a display such as a liquid crystal display that has inner and outer linear polarizers. The outer polarizer may have a transmission axis that is parallel to horizontal edges of the first display.

The second display may be a display such as an organic light-emitting diode display. The organic light-emitting diode display may have pixels containing thin-film transistors and organic light-emitting diodes that emit light. A circular polarizer that covers the pixels may be used to suppress ambient light reflections.

A wave plate may be formed on the outer surface of the display. The wave plate may be a half wave plate to rotate horizontally polarized light exiting the outer polarizer to a vertical orientation or may be a quarter wave plate that circularly polarizes the light exiting the outer polarizer.

The circular polarizer of the second display may have a linear polarizer with a transmission axis that runs parallel to the horizontal edges and may have a quarter wave plate interposed between the linear polarizer and the pixels. In configurations in which the first display emits vertically polarized light, the linear polarizer of the second display may absorb the vertically polarized light and thereby suppress reflections. In configurations in which the first display emits circularly polarized light, an additional quarter wave plate may be placed on top of the circular polarizer of the second display to help suppress reflections of light from the first display.

DETAILED DESCRIPTION

Figure 1:
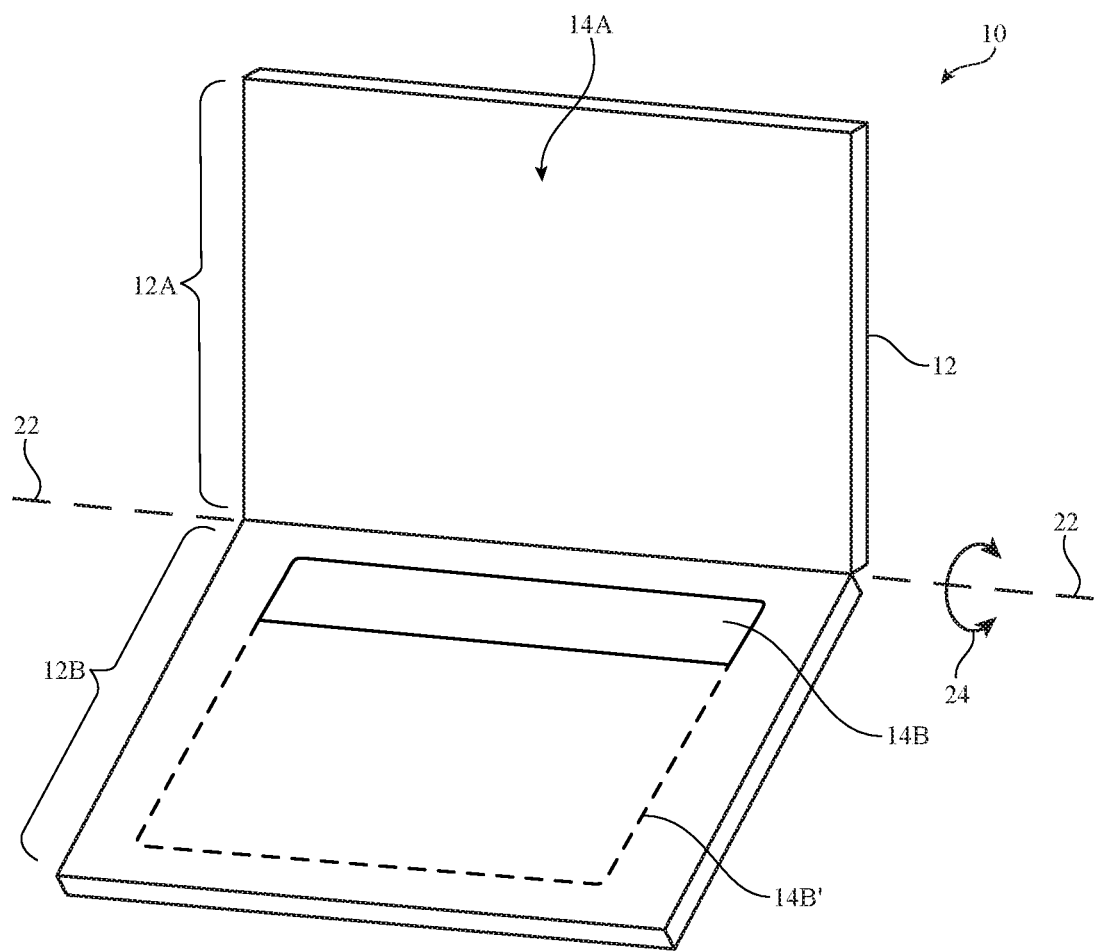
FIG. 1 is a perspective view of an illustrative electronic device with displays in accordance with an embodiment.

An electronic device such as electronic device 10 of FIG. 1 may have displays. Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, may be a tablet computer that is attached to a detachable cover with a keyboard or other accessory, or may be other electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Housing 12 may have portions that move with respect to each other. As shown in FIG. 1, for example, housing 12 may include a first portion such as upper housing (lid) 12A and a second portion such as lower housing (base) 12B that moves with respect to the first portion. A hinge may allow upper housing 12A to rotate relative to lower housing 12B in directions 20 about axis 22. Housing 12A and housing 12B may be attached to each other using a permanent hinge arrangement (e.g., in a configuration in which device 10 is a laptop computer) or housing 12A and housing 12B may be parts of separate components that can be attached using a magnetic hinge or other detachable hinge mechanism (e.g., when housing 12A is a tablet computer housing and housing 12B is a detachable tablet computer accessory such as a keyboard or a tablet computer cover with a keyboard).

Device 10 may have displays such as upper display 14A and lower display 14B. Lower display 14B may extend into area 14B' or area 14B' may be used to house components such as a trackpad, keyboard, or other input-output devices (as an example). Display such as displays 14A and 14B may be formed using any suitable display technology. For example, displays such as display 14A and/or display 14B may be liquid crystal displays (LCD), plasma displays, organic light-emitting diode (OLED) displays, electrophoretic displays, microelectromechanical systems (MEMs) shutter displays, or displays implemented using other display technologies. A touch sensor may be incorporated into displays 14A and/or 14B (i.e., displays 14A and/or 14B may be touch screen displays) or displays 14A and/or 14B may be insensitive to touch. Touch sensors for displays 14A and 14B may be resistive touch sensors, capacitive touch sensors, acoustic touch sensors, light-based touch sensors, force sensors, or touch sensors implemented using other touch technologies.

Figure 2:
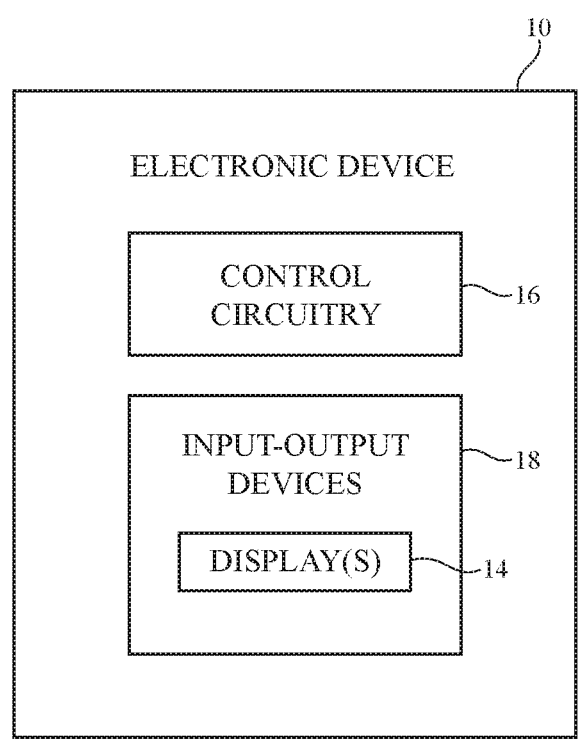
FIG. 2 is a schematic diagram of an illustrative electronic device with displays in accordance with an embodiment.

A schematic diagram of an illustrative electronic device such as device 10 of FIG. 1 is shown in FIG. 2. As shown in FIG. 2, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 18 and may receive status information and other output from device 10 using the output resources of input-output devices 18. Input-output devices 18 may include one or more displays such as displays 14 (e.g., displays 14A and 14B).

Control circuitry 16 may be used to run software on device 10 such as operating system code and applications. During operation of device 10, the software running on control circuitry 16 may display images on displays 14A and 14B (e.g., video, still images such as text, alphanumeric labels, photographs, icons, other graphics, etc.) using arrays of pixels in displays 14A and 14B.

Displays 14A and 14B may have rectangular shapes or other suitable shapes. For example, displays 14A and 14B may each have a rectangular footprint and a rectangular peripheral edge that runs around the rectangular footprint). Displays 14A and 14 B may be planar or may have curved profiles.

Displays 14A and 14B may be formed using the same type of display technology or displays 14A and 14B may be different types of displays. For example, both of displays 14A and 14B may be liquid crystal displays or both of displays 14A and 14B may be organic light-emitting diode displays. If desired, display 14A may be an organic light-emitting diode display and display 14B may be a liquid crystal display. Still other configurations in which displays 14A and/or 14B are formed using other types of display technology may be used, if desired. With one suitable arrangement, which may sometimes be described herein as an example, display 14A may be a liquid crystal display and display 14B may be an organic light-emitting diode display. This is, however, merely illustrative. Displays such as displays 14A and 14B may be formed using other types of display technology, if desired.

Figure 3:
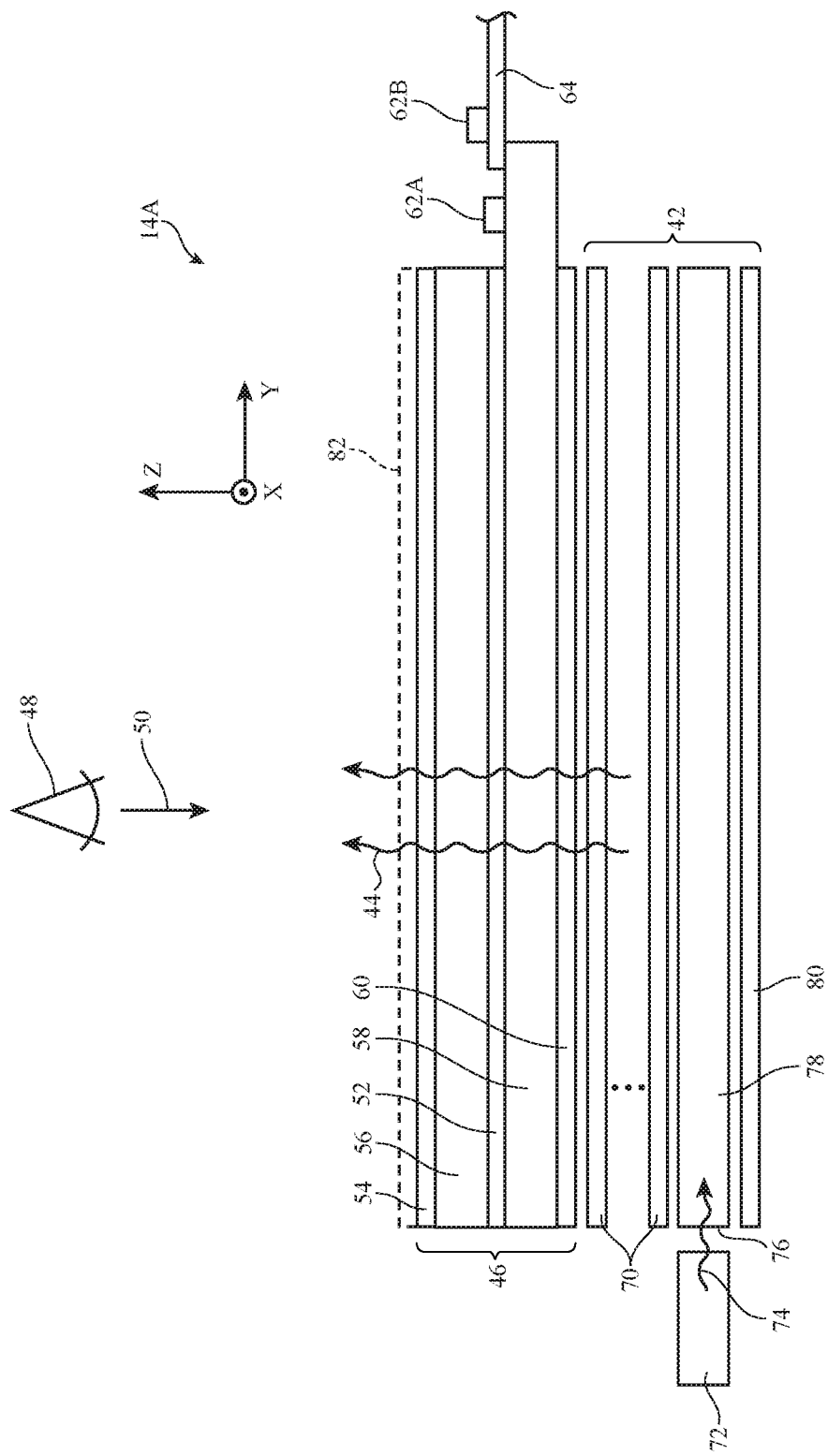
FIG. 3 is a cross-sectional side view of an illustrative liquid crystal display in accordance with an embodiment.

FIG. 3 is a cross-sectional side view of an illustrative liquid crystal display for device 10. As shown in FIG. 3, display 14A may include backlight structures such as backlight unit 42 for producing backlight 44. During operation, backlight 44 travels outwards (vertically upwards in dimension Z in the orientation of FIG. 3) and passes through pixels in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

Display layers 46 may include a liquid crystal layer such a liquid crystal layer 52. Liquid crystal layer 52 may be sandwiched between display layers such as display layers 58 and 56. Layers 56 and 58 may be interposed between lower (inner) polarizer layer 60 and upper (outer) polarizer layer 54.

Layers 58 and 56 may be formed from transparent substrate layers such as clear layers of glass or plastic. Layers 58 and 56 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14A. Layer 56 may be a color filter layer that includes an array of color filter elements for providing display 14A with the ability to display color images. If desired, layer 58 may be a color filter layer and layer 56 may be a thin-film transistor layer. Configurations in which color filter elements are combined with thin-film transistor structures on a common substrate layer in the upper or lower portion of display 14A may also be used.

During operation of display 14A in device 10, control circuitry (e.g., one or more integrated circuits on a printed circuit) may be used to generate information to be displayed on display 14A (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide layer such as light guide layer 78. Light guide layer 78 may be formed from a transparent material such as clear glass or plastic (e.g., molded plastic that forms a light guide plate, a thin flexible plastic film, etc.). During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide layer 78 due to the principal of total internal reflection. Light guide layer 78 may include light-scattering features such as pits or bumps or other light-scattering structures. The light-scattering features may be located on an upper surface and/or on an opposing lower surface of light guide layer 78. Light source 72 may be located at the left of light guide layer 78 as shown in FIG. 3 or may be located along the right edge of layer 78 and/or other edges of layer 78.

Light 74 that scatters upwards in direction Z from light guide layer 78 may serve as backlight 44 for display 14A. Light 74 that scatters downwards may be reflected back in the upwards direction by reflector 80. Reflector 80 may be formed from a reflective material such as a layer of plastic covered with a dielectric mirror thin-film coating.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and light collimating films such as brightness enhancement films and turning films. Optical films 70 may overlap the other structures in backlight unit 42 such as light guide layer 78 and reflector 80. For example, if light guide layer 78 has a rectangular footprint in the X-Y plane of FIG. 3, optical films 70 and reflector 80 may have a matching rectangular footprint. If desired, films such as compensation films may be incorporated into other layers of display 14 (e.g., polarizer layers).

Display 14A may include one or more additional layers such as layer 82 on top of polarizer 54. For example, layers such as layer 82 may include a wave plate or other optical film to adjust the polarization of the light exiting display 14A.

Figure 4:
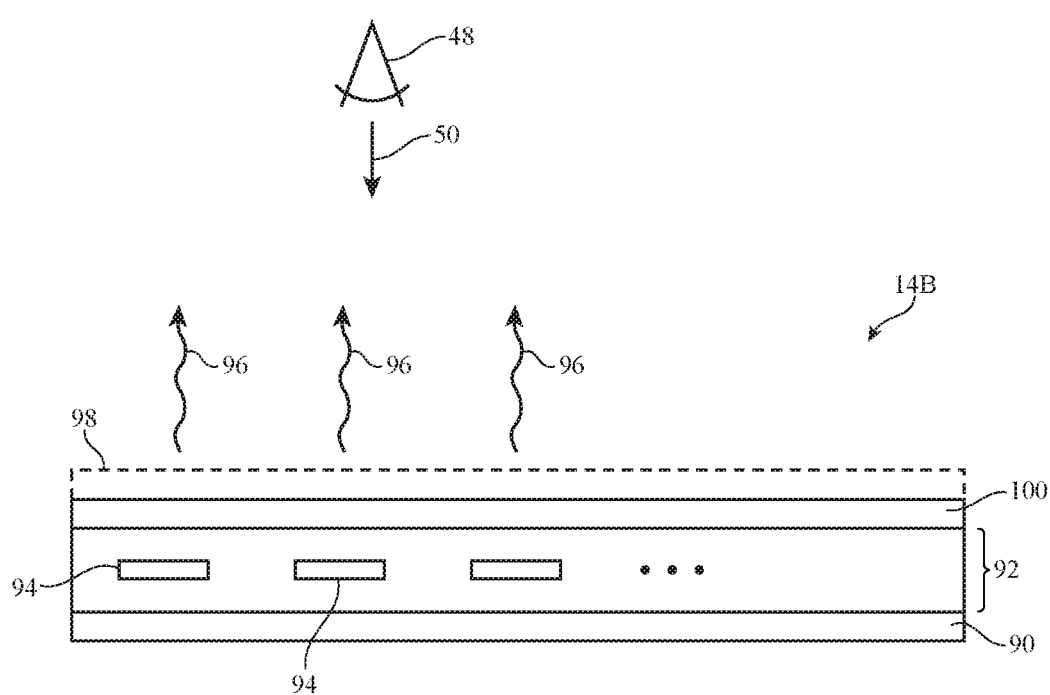
FIG. 4 is a cross-sectional side view of an illustrative organic light-emitting diode display in accordance with an embodiment.

FIG. 4 is a cross-sectional side view of an illustrative organic light-emitting diode display for use as display 14B or other display in electronic equipment such as device 10. As shown in FIG. 4, display 14B may include a substrate layer such as substrate layer 90. Substrate 90 may be formed from a polymer or other suitable materials. Thin-film transistor circuitry 92 may be formed on substrate 90. Thin film transistor circuitry 92 may include inorganic layers such as inorganic buffer layers, barrier layers (e.g., barrier layers to block moisture and impurities), gate insulator, passivation, interlayer dielectric, and other inorganic dielectric layers. Thin-film transistor circuitry 92 may also include organic dielectric layers such as a polymer planarization layer. Metal layers and semiconductor layers may be included within thin-film transistor circuitry 92 to form transistors and light-emitting diodes. For example, semiconductors such as silicon, semiconducting-oxide semiconductors, or other semiconductor materials may be used in forming semiconductor channel regions for thin-film transistors. Metal may be used in forming transistor gate terminals, transistor source-drain terminals, capacitor electrodes, and metal interconnects.

Light-emitting diodes 94 may be formed from the patterned layers of material in thin-film transistor circuitry 92 and may serve as pixels for display 14A. In each light-emitting diode, organic emissive material and other light-emitting diode layers may be interposed between a respective anode and cathode. During operation, light-emitting diodes 94 may emit light 96 for forming images for viewing by viewer 48. Layers such as layers 98 and 100 may be formed on top of thin-film transistor circuitry 92. Layer 100 may be a circular polarizer for suppressing ambient light reflections from metal structures and other reflective structures in thin-film transistor circuitry 92. Optional layer 98 may be a wave plate or other optical film for adjusting the polarization of emitted light 96. Wave plates in device 10 may be formed from single-layer structures or multi-layer structures to provide broadband transmission spectrums and wide viewing angles.

Figure 5:
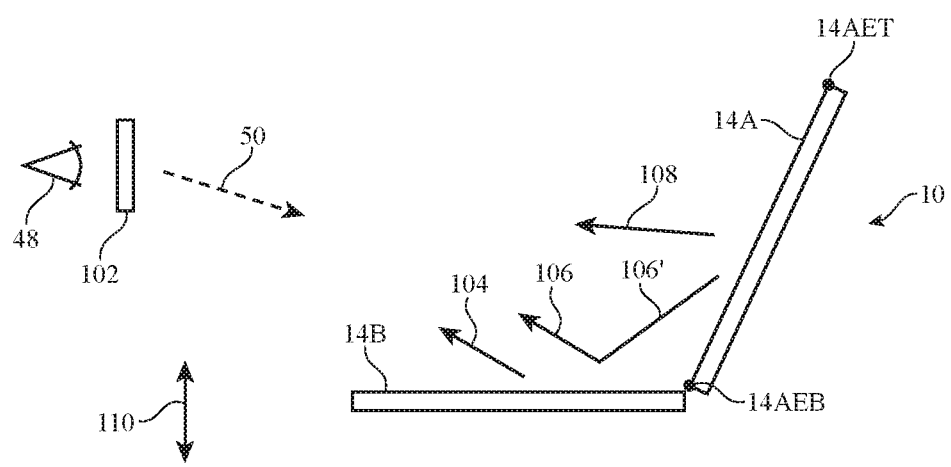
FIG. 5 is a side view of an illustrative electronic device in accordance with an embodiment.

FIG. 5 is a side view of device 10 showing illustrative light paths that may be associated with the light emitted from displays 14A and 14B when viewed by viewer 48 in direction 50. In the orientation of FIG. 5, horizontal upper edge 14AET and horizontal lower edge 14AEB of display 14A extend horizontally with respect to viewer 48 during normal viewing (e.g., into and out of the page of FIG. 5).

As shown in FIG. 5, display 14A may be oriented at an angle with respect to display 14B (i.e., displays 14A and 14B may be planar displays characterized by respective surface normals that separated by an angle of 90-130° or other non-zero angle from each other). Viewer 48 may view displays 14A and 14B with the naked eye or may view displays 14A and 14B through polarizing glasses such as sunglasses 102. The polarization states of the light rays that reach viewer 48 from displays 14A and 14B and the orientation of polarizing sunglasses 102 can affect the visibility of displays 14A and 14B. Ideally, displays 14A and 14B will be visible to the user and will be relatively free from unwanted reflections both when viewer 48 is wearing sunglasses and when viewer 48 is not wearing sunglasses.

As shown in FIG. 5, display 14A may emit light rays 108 that follow light paths directly towards a viewing location associated with viewer 48. Display 14B may emit light rays 104 that follow light paths directly towards viewer 48. It may be desirable to configure the output polarization of displays 14A and 14B so that the images on displays 14A and 14B are visible to the viewer even if the viewer is wearing sunglasses 102.

Another concern involves reflected light. Some of the light emitted from display 14A has the potential to reflect from display 14B. For example, emitted light 106' from display 14A may reflect from the surface of display 14B towards the viewing location of viewer 48 as illustrated by light ray 106. In this situation, the images on displays 14A and 14B will generally be visible to the user, but there is a risk that the visibility of the content on display 14B will be diminished due to the presence of undesired reflected light 106.

To ensure optimum performance of the displays in device 10, displays 14A and 14B may be configured to suppress reflected light 106. At the same time, it may be desirable to configure displays 14A and 14B to enhance display viewing in the presence of sunglasses 102.

Figure 6:
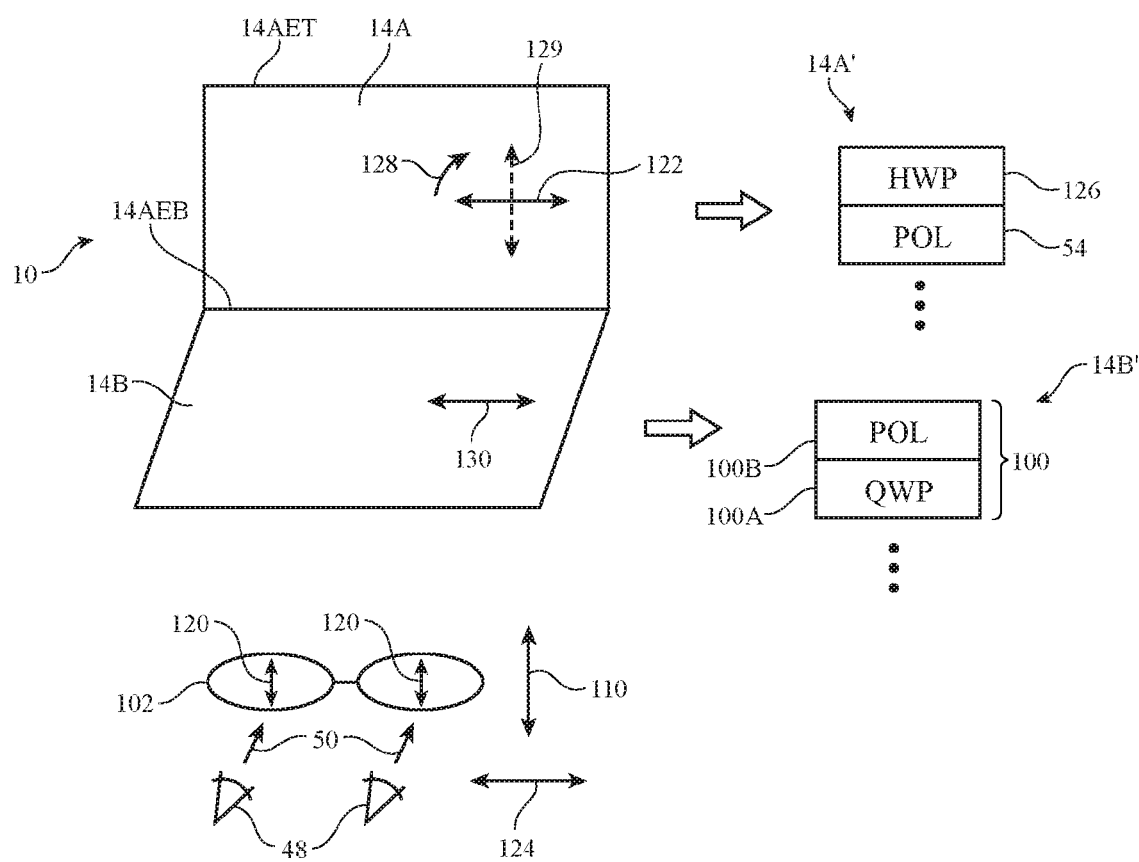
FIGS. 6, 7, and 8 are diagrams showing illustrative polarizers and other optical layers that may be incorporated into displays in an electronic device in accordance with an embodiment.
Figure 7:
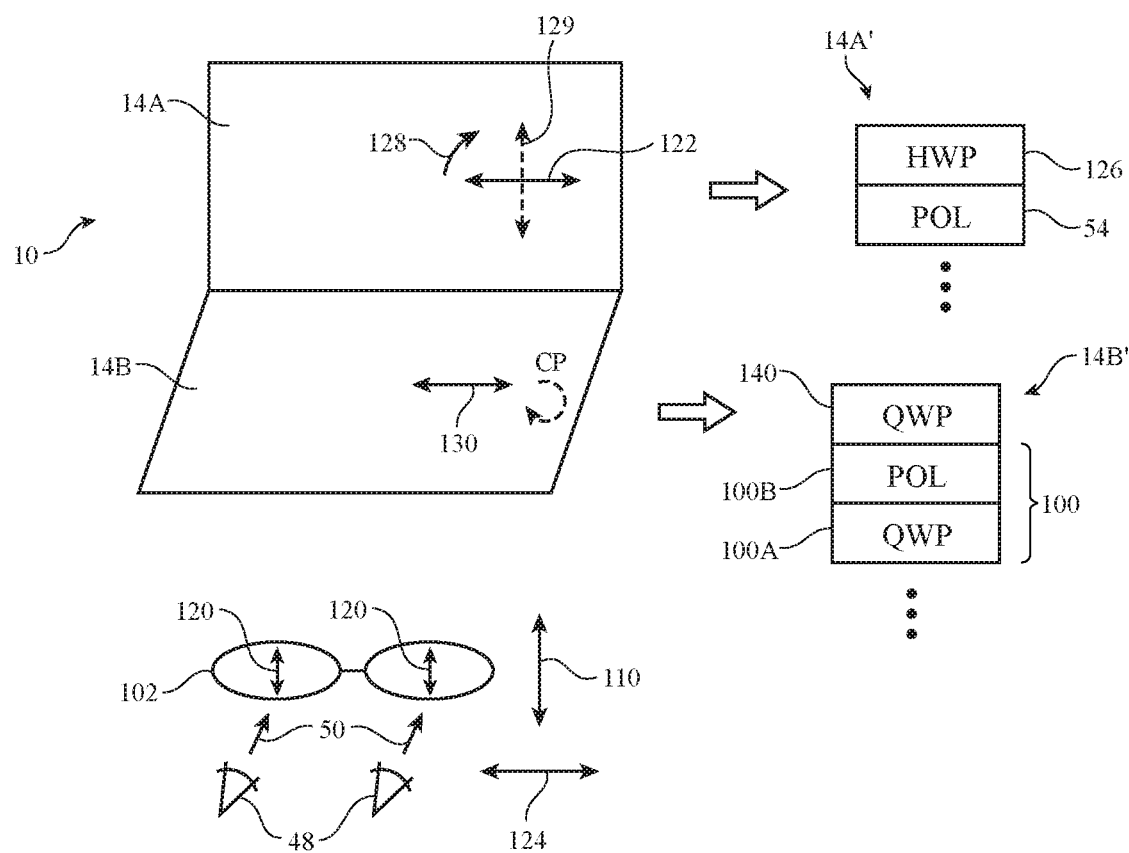
Figure 8:
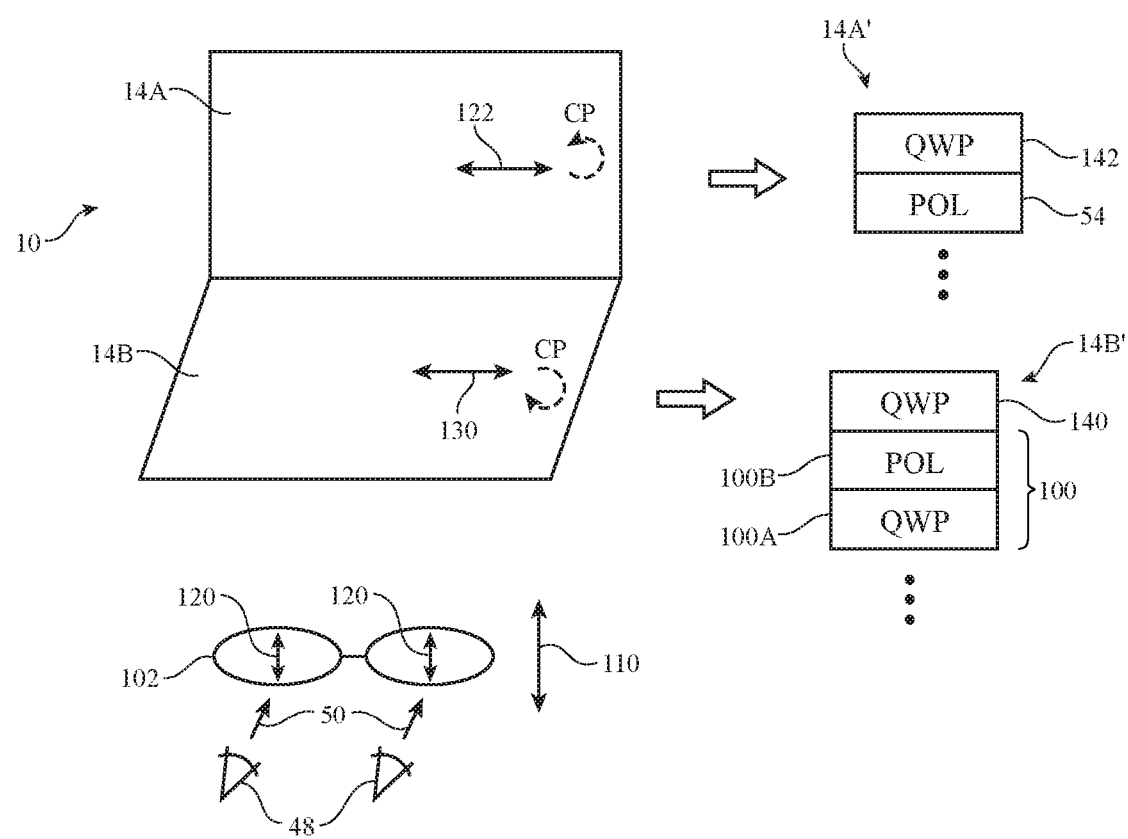

Illustrative configurations for the optical layers in displays 14A and 14B that may be used to suppress reflections and/or enhance sunglass visibility of displays 14A and/or 14B are shown in FIGS. 6, 7, and 8.

In the example of FIG. 6, viewer 48 is viewing displays 14A and 14B through sunglasses 102 in direction 50. Each lens in sunglasses 102 has a linear polarizer with a transmission axis 120 that runs vertically, parallel to vertical dimension 110. Display 14A may be a liquid crystal display having a linear upper polarizer such as polarizer 54 of FIG. 3. Display 14A may use negative liquid crystal material and may exhibit enhanced off-axis viewing performance when pass axis 122 of polarizer 54 is oriented horizontally (i.e., when pass axis 122 is horizontal and runs parallel to horizontal dimension 124, horizontal upper edge 14AET, and horizontal lower edge 14AEB of display 14A when display 14A is oriented for normal viewing by viewer 48).

Display 14B may be an organic light-emitting diode display of the type shown in FIG. 4. As shown on the right-hand side of FIG. 6, the uppermost layers of display 14B (i.e., layers 14B') may include a circular polarizer such as circular polarizer 100 to suppress ambient light reflections. Circular polarizer 100 may have a quarter wave plate such as quarter wave plate 100A and a linear polarizer such as polarizer 100B. Transmission axis 130 of linear polarizer 100B may run parallel to horizontal direction 124.

When light from display 14A has a polarization aligned with transmission axis 122 (i.e., when this light is s-polarized), there is an elevated risk that this light will reflect from display 14B (i.e., if light 106' of FIG. 5 is s-polarized, the intensity of reflected light 106 may be relatively strong). To help suppress reflected light in device 10 of FIG. 6, half-wave plate 126 may be incorporated into the uppermost layers 14A' of display 14. As shown on the right side of FIG. 6, for example, half-wave plate 126 may be formed on top of polarizer layer 54. As light from the pixels of display 14A passes through polarizer layer 54, the light will become linearly polarized in alignment with polarizer transmission (pass) axis 122. The optical axis of half-wave plate 126 may be oriented at an angle that bisects horizontal direction 124 and vertical direction 110 (i.e., a 45° angle). With half-wave plate 126 in this orientation, the horizontally polarized light that is exiting polarizer layer 54 will be rotated (e.g., in direction 128) by 90° to vertical polarization axis 129 in alignment with vertical direction 110 (i.e., the light exiting display 14A will be p-polarized and therefore vertically polarized with respect to viewer 48). When this p-polarized light (see, e.g., light ray 106' of FIG. 5) enters polarizer 100B of display 14B, which has a transverse pass axis (axis 130), the p-polarized light will be absorbed by polarizer 100B. As a result, the intensity of reflected light 106 will be relatively weak (i.e., reflected light 106 will be suppressed). Reflection of light 106' from the surface of polarizer 100B (i.e., before absorption by polarizer 100B) will also be reduced due to the p-polarization of light 106'.

Because the light exiting display 14A is polarized vertically along vertical dimension 110 due to the presence of half-wave plate 126, the polarization of light 108 will be aligned with pass axis 120 of the linear polarizer of sunglasses 102. Display 14A will therefore exhibit good sunglass readability. However, transmission axis 130 of polarizer 100B will be perpendicular to transmission axis 120, which can reduce the sunglass readability of display 14B.

To enhance the sunglass readability of display 14B, a quarter wave plate such as quarter wave plate 140 of FIG. 7 may be added to display 14B. With this arrangement, display 14A has good sunglass readability, because light 108 from display 14A is vertically polarized. Due to the presence of quarter wave plate 140, the light exiting display 14B such a light 104 of FIG. 5 will be circularly polarized (CP). This circularly polarized light will be converted to linearly polarized light (at a 50% loss of intensity) when passing through sunglasses 102. The sunglass readability of display 14B will therefore be satisfactory. The intensity of reflected light 106 will be increased relative to the arrangement of FIG. 6, because about 50% of light 106' will pass through polarizer 140 to contribute to reflected light 106, but about 50% of the reflected light will be suppressed.

In order to simultaneously enhance sunglass readability for both display 14A and display 14B while suppressing reflections of light 106' from display 14B, an arrangement of the type shown in FIG. 8 may be used. In the arrangement of FIG. 8, half-wave plate 126 of display 14A has been replaced by quarter wave plate 142 (as shown in the cross-sectional side view of upper display layers 14A' of display 14A in FIG. 8). Due to the presence of quarter wave plate 142, light 108 will be circularly polarized (CP) and viewer 48 will therefore be able to view display 14A through sunglasses 102 (with a light intensity reduction of 50%) or without sunglasses 102 (with no reduction in light intensity).

Quarter wave plate 140 of display 14B causes the light emitted by the pixels of display 14B (light 104 of FIG. 5) to be circularly polarized (CP). Viewer 48 will therefore be able to view display 14B through sunglasses 102 (with a light intensity reduction of 50%) or without sunglasses 102 (with no reduction in light intensity).

Quarter wave plates 140 and 142 may have optical axes that are configured to cumulatively form a half wave plate for light emitted from display 14A such as light 106'. On exiting display 14A, quarter wave plate 142 causes the light emitted by the pixels of display 14A to become circularly polarized. When this circularly polarized light enters quarter wave plate 140 (along path 106'), this light will be converted into linearly polarized light with a polarization axis perpendicular to the horizontal transmission axis (axis 130) of polarizer 100B and will therefore be absorbed. Because light 106' is absorbed by polarizer 100B, the intensity of reflected light 106 will be relatively small (i.e., reflections of light 106' from display 14B will be suppressed). (There may, however, be more surface reflections from quarter wave plate 140 than in the configurations of FIGS. 6 and 7.)

The foregoing is merely illustrative and various modifications can be made by those skilled in the art without departing from the scope and spirit of the described embodiments. The foregoing embodiments may be implemented individually or in any combination.

What is claimed is:

1. Electronic equipment, comprising:
   first and second housings that rotate relative to each other about a hinge axis;
   a first display in the first housing that emits light; and
   a second display in the second housing that emits light, wherein the first display has a first linear polarizer and a wave plate, wherein the second display has a second linear polarizer, wherein the light emitted from the first display passes through the first linear polarizer then the wave plate before being emitted, and wherein the wave plate adjusts how the light emitted from the first display is polarized to suppress reflections of the light emitted from the first display off of the second display when the angle between the first and second housings is non-zero.

2. The electronic equipment defined in claim 1 wherein the first display comprises a liquid crystal display, wherein the light emitted from the first display is linearly polarized, wherein the second display comprises an organic light-emitting diode display, and wherein the second display emits circularly polarized light.

3. The electronic equipment defined in claim 1, further comprising:
a keyboard in the second housing.

4. The electronic equipment defined in claim 1 wherein the wave plate is configured so that the light emitted from the first display is linearly polarized and is vertically polarized.

5. The electronic equipment defined in claim 4 wherein the second display has a wave plate, wherein the light emitted from the second display passes through the second linear polarizer then the wave plate of the second display before being emitted.

6. The electronic equipment defined in claim 5 wherein the second display includes a circular polarizer and wherein the second linear polarizer forms part of the circular polarizer.

7. The electronic equipment defined in claim 6 wherein the wave plate of the second display is a quarter wave plate.

8. The electronic equipment defined in claim 7 wherein the second display has an array of organic light-emitting diode pixels and wherein the circular polarizer is interposed between the quarter wave plate and the array of organic light-emitting diode pixels.

9. The electronic equipment defined in claim 8 wherein the first display comprises a liquid crystal display.

10. The electronic equipment defined in claim 1, wherein the wave plate is a first wave plate, wherein the second display has a second wave plate and a third wave plate, and wherein the second linear polarizer is interposed between the second wave plate and the third wave plate.

11. The electronic equipment defined in claim 10, wherein the first wave plate is a first quarter wave plate, the second wave plate is a second quarter wave plate, and the third wave plate is a third quarter wave plate.

12. The electronic equipment defined in claim 10, wherein the first wave plate is a first half wave plate, the second wave plate is a first quarter wave plate, and the third wave plate is a second quarter wave plate.

13. The electronic equipment defined in claim 1, wherein the first linear polarizer is a first outer-most linear polarizer, wherein the second display has a first quarter wave plate and a second quarter wave plate, and wherein the second linear polarizer is a second outer-most linear polarizer interposed between the first quarter wave plate and the second quarter wave plate.

14. The electronic equipment defined in claim 13, wherein the wave plate is a third quarter wave plate.

15. The electronic equipment defined in claim 13, wherein the wave plate is a first half wave plate.

16. Electronic equipment, comprising:
a first housing;
a second housing;
an organic light-emitting diode display in the second housing, wherein the organic light-emitting diode display includes a first linear polarizer; and
a liquid crystal display in the first housing that rotates about a hinge axis with respect to the organic light-emitting diode display, wherein the liquid crystal display has an inner linear polarizer, an outer-most linear polarizer, a layer of liquid crystal material interposed between the inner linear polarizer and the outer-most linear polarizer, and a wave plate, wherein the outer-most linear polarizer is interposed between the wave plate and the inner linear polarizer, and wherein the wave plate adjusts how linearly polarized light exiting the outer-most linear polarizer is polarized to suppress reflections of the light emitted from the liquid crystal display off of the organic light-emitting diode display when the angle between the first and second housings is non-zero.

17. The electronic equipment defined in claim 16 wherein the wave plate comprises a half wave plate that rotates the linearly polarized light exiting the outer-most linear polarizer by 90°.

18. The electronic equipment defined in claim 17 wherein the organic light-emitting diode display has an array of pixels and a circular polarizer that overlaps the array of pixels and wherein the circular polarizer includes the first linear polarizer and a quarter wave plate.

19. The electronic equipment defined in claim 18 wherein the organic light-emitting diode display has an additional quarter wave plate and wherein the circular polarizer is interposed between the additional quarter wave plate and the array of pixels.

20. The electronic equipment defined in claim 16 wherein the wave plate comprises a half wave plate, wherein the organic light-emitting diode display comprises an array of pixels and a circular polarizer that overlaps the array of pixels, and wherein the circular polarizer includes the first linear polarizer and a quarter wave plate.

21. The electronic equipment defined in claim 20 wherein the organic light-emitting diode display comprises an additional quarter wave plate and wherein the circular polarizer is interposed between the array of pixels and the additional quarter wave plate.

22. Electronic equipment, comprising:
a liquid crystal display that emits circularly polarized light, wherein the liquid crystal display includes a layer of liquid crystal material, a first quarter wave plate, and an outer-most linear polarizer that is interposed between the layer of liquid crystal material and the first quarter wave plate; and
an organic light-emitting diode display adjacent to the liquid crystal display and oriented at an angle with respect to the liquid crystal display that allows light from the liquid crystal display to reflect off of the organic light-emitting diode display, wherein the organic light-emitting diode display includes a second quarter wave plate, pixels that emit light, a first linear polarizer between the second quarter wave plate and the pixels, and a third quarter wave plate between the first linear polarizer and the pixels, wherein the first linear polarizer is interposed between the second quarter wave plate and third quarter wave plate.

23. The electronic equipment defined in claim 22 wherein the liquid crystal display has a backlight unit and wherein backlight from the backlight unit passes through the outer-most linear polarizer before passing through the first quarter wave plate.

* * * * *